United States Patent
Gilson et al.

(10) Patent No.: US 9,531,578 B2
(45) Date of Patent: Dec. 27, 2016

(54) CONNECTING DEVICES TO NETWORKS

(71) Applicant: Comcast Cable Communications, LLC, Philadelphia, PA (US)

(72) Inventors: Ross Gilson, Philadelphia, PA (US); Michael Sallas, Radnor, PA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 29 days.

(21) Appl. No.: 14/270,452

(22) Filed: May 6, 2014

(65) Prior Publication Data
US 2015/0327060 A1    Nov. 12, 2015

(51) Int. Cl.
| | |
|---|---|
| H04L 29/06 | (2006.01) |
| H04W 76/02 | (2009.01) |
| H04W 12/06 | (2009.01) |
| H04L 29/08 | (2006.01) |

(52) U.S. Cl.
CPC ............ *H04L 29/06* (2013.01); *H04L 63/08* (2013.01); *H04L 67/141* (2013.01); *H04L 67/16* (2013.01); *H04W 12/06* (2013.01); *H04W 76/02* (2013.01); *H04W 76/021* (2013.01)

(58) Field of Classification Search
CPC .... H04W 12/06; H04W 48/20; H04W 76/021; H04W 76/02; H04L 63/08; H04L 63/083; H04L 63/107; H04L 29/06; H04L 67/141; H04L 67/16

USPC .......................................................... 726/6, 7
See application file for complete search history.

(56) References Cited

U.S. PATENT DOCUMENTS

| | | | | |
|---|---|---|---|---|
| 2009/0327560 | A1* | 12/2009 | Yalovsky | G06F 13/387 710/303 |
| 2012/0266217 | A1* | 10/2012 | Kaal | H04L 63/0407 726/4 |
| 2013/0247161 | A1* | 9/2013 | Bajko | H04L 9/3268 726/7 |
| 2013/0309971 | A1* | 11/2013 | Kiukkonen | H04L 63/107 455/41.2 |
| 2014/0282967 | A1* | 9/2014 | Maguire | H04W 36/18 726/7 |
| 2015/0223068 | A1* | 8/2015 | Thelen | H04L 63/083 726/7 |

* cited by examiner

*Primary Examiner* — Yogesh Paliwal
(74) *Attorney, Agent, or Firm* — Banner & Witcoff, Ltd.

(57) ABSTRACT

Illustrative aspects described herein relate to assisting wireless devices, such as dependent devices, in connecting to an access point or associated wireless network. Dependent wireless devices may lack user interfaces, which may make it difficult for a user to input credentials for accessing the access point directly from the wireless device. Assisting the wireless device in connecting to the access point may be done through the access point or through other devices, such as host devices. Additionally, the wireless device may connect to the access point using other devices having user interfaces.

20 Claims, 12 Drawing Sheets

CONNECTING DEVICES TO NETWORKS

BACKGROUND

Wireless networks are becoming ubiquitous. Signing a device on to a wireless network typically requires that a user of the device enter at least a wireless network password or other information, and often also requires that the user select or enter a wireless network identifier (e.g., a Service Set Identifier, or SSID). However, entry of data can be difficult, or impossible, for some devices, such as those that lack a user interface display or keyboard. There remains an ever-present need for easy-to-use techniques for connecting such devices to wireless networks.

SUMMARY

The following summary is for illustrative purposes only, and is not intended to limit or constrain the detailed description or claims.

Features herein relate to assisting devices to connect to wireless networks. In some aspects, a first device, such as a host device, that is already connected to a wireless network can detect wireless announcement messages from other devices that might desire help connecting to the wireless network. The announcement messages may contain information identifying the sending device as a dependent wireless device (DWD), and may identify the dependent wireless device's characteristics, such as device type, model, communication capabilities, identification code, address, etc. The first device may authenticate the DWD for access to the wireless network and may transmit a message to assist with connecting the DWD with the wireless network. That message may comprise, for example, network credentials (e.g., network identifier, password, etc.) for signing on to the wireless network. In some aspects, the first device may communicate with the DWD through a different network than the wireless network that the DWD desires to connect to (e.g., when the DWD is not yet capable of communicating on the wireless network). The message may additionally or alternatively be sent to an access point of the wireless network, informing the access point of the first device's authentication of the DWD.

In some aspects, the authentication may comprise using the first device's display and user interface capabilities to obtain user authorization to connect the DWD to the wireless network. For example, the first device may comprise a tablet computer or mobile phone loaded with or having access to a home security application, and the DWD may comprise a plurality of door, motion, or window sensors. Upon detecting the plurality of wireless sensors, the tablet computer or mobile phone may display a prompt to a user, informing the user that a number of sensors have been detected and request authorization to use the wireless network, which may comprise a home wireless network.

If the user authorizes the DWD(s), then the first device may provide wireless network security credentials to the DWD(s), for the DWD(s) to use to connect to the wireless network. Alternatively, the first device may inform an access point of the wireless network that the DWD(s) have been authenticated. The access point may subsequently allow the DWD(s) to connect to the wireless network.

In some aspects, an access point of the wireless network and the DWD may use user interface capabilities of the first device. For example, the first device may display messages and prompt for network sign-on information from the access point (e.g., entry of a password). User input capabilities of the first device (e.g., a remote control, buttons on the device, etc.) may also be used, such that user inputs may be provided to the interface of the first device (e.g., giving the user feedback on what has been entered) and also delivered to the access point. The user inputs may be delivered in response to the access point requesting the information from the first device.

In some aspects, near-field communication technique may be used to allow the first device to share network credential information with DWDs. For example, a user may connect the user's tablet computer to a wireless network, and place the tablet computer in a network sharing mode. In this mode, the tablet computer may be moved to within a predetermined proximity of one or more DWDs. Once moved to within the predetermined proximity, the tablet may provide wireless network credentials to the DWDs, or may obtain identification information from the DWDs and send, to the access point, with an indication that the DWDs have been authorized by the first device to access to the wireless network.

In some aspects, a DWD may use a first wireless protocol to announce its desire for assistance in connecting to a wireless network that employs a second wireless protocol. In these aspects, a router may be configured to support both protocols. The router may receive the announcement over the first protocol and provide credential information to the DWD using the first protocol to allow the DWD to sign on to the wireless network using the second protocol.

In some aspects, a first DWD may successfully connect to the wireless network and subsequently share network credential information with other DWDs to allow them to connect to the wireless network as well. For example, during the initial authorization of the first DWD, that device may request authorization on behalf of one or more additional DWDs. In one embodiment, a home security window sensor may request authorization on behalf of other window sensors. After the first DWD receives the wireless network credentials, it may send or otherwise share those credentials to other devices in its authorized group. This propagation may be limited to a predetermined time window (e.g., to other sensors that are turned on within 2 minutes of the first one's authorization), or to a predetermined group of DWDs (e.g., to sensors that are identified as part of the original authorization).

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
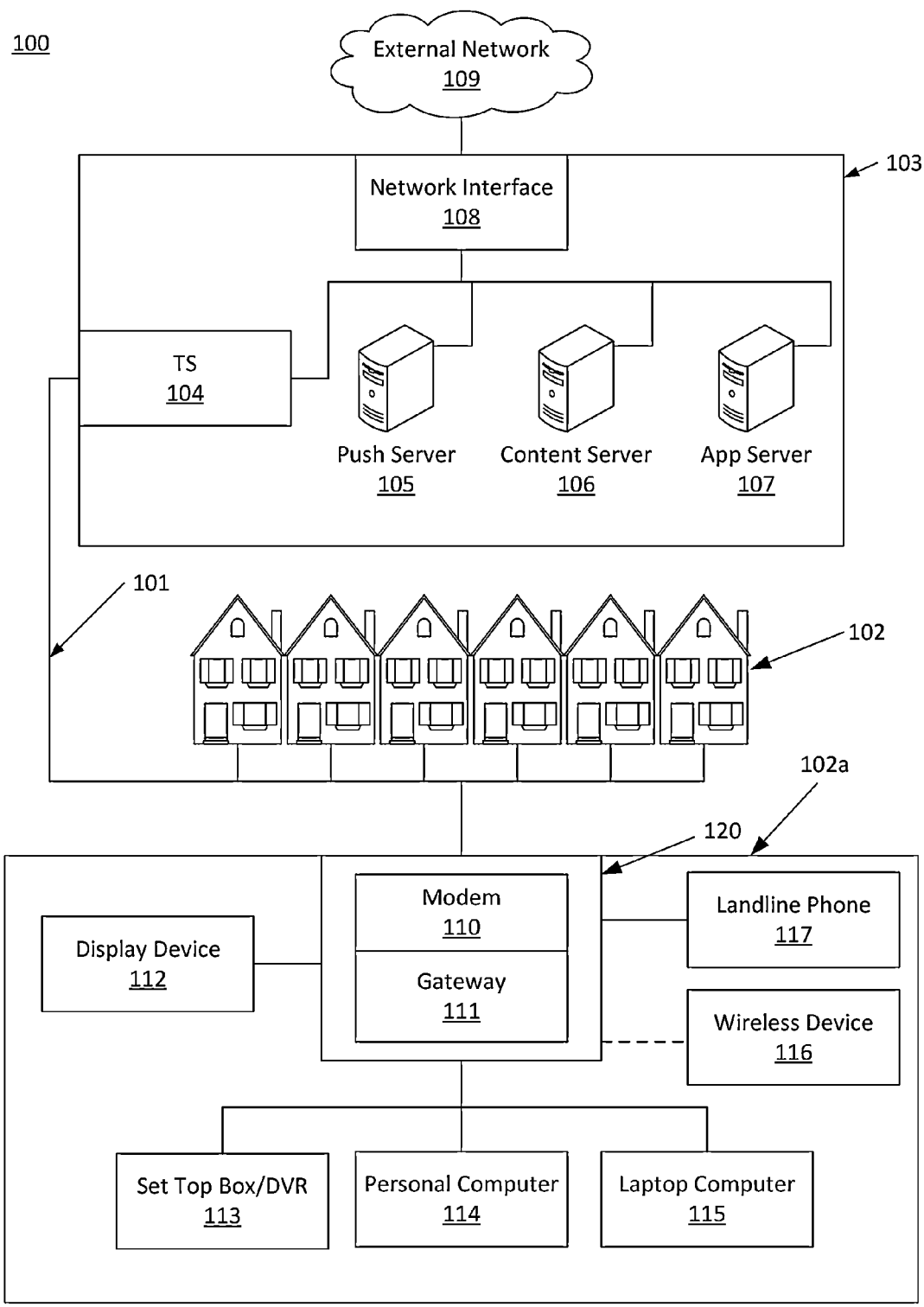
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single local office 103 to reach even farther with its network of links 101 than before.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry used to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premise 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem (s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

MoCA may be used to extend a wireless network, via a wireless Ethernet to Coax Bridge (ECB), to wireless clients that are out of range of a wireless access point (WAP) 118. An ECB may be connected to WAP 118 using coaxial cable. WAP 118 may automatically transmit wireless configuration information and credentials to the ECB. The configuration data may include wireless network parameters, security parameters, configuration and control information about connected devices, and performance characteristics. The wireless network parameters may include but are not limited to SSID, channel number, wireless protocol (802.11 a/b/g/n), and frequency bands of operation. In one embodiment, the security parameters may include encryption protocols (WEP, WPA, WPA2, etc.). The ECB may be managed by Home Network Administration Protocol (HNAP). The ECB may have a backchannel to gateway 111. Information sent to the ECB may be backhauled over MoCA to gateway 111.

Figure 2:
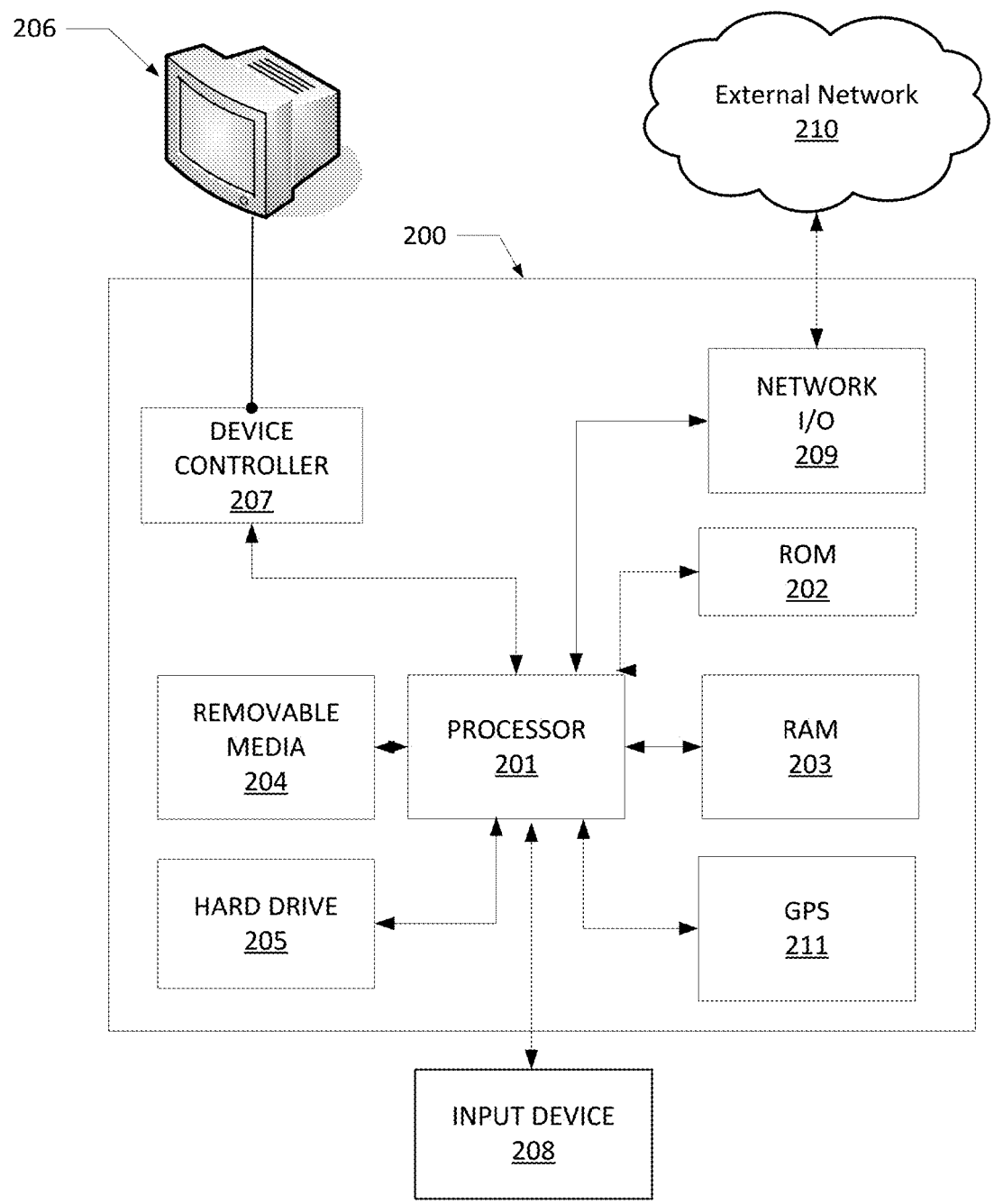
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration, although the illustrated components may be implemented as software as well. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
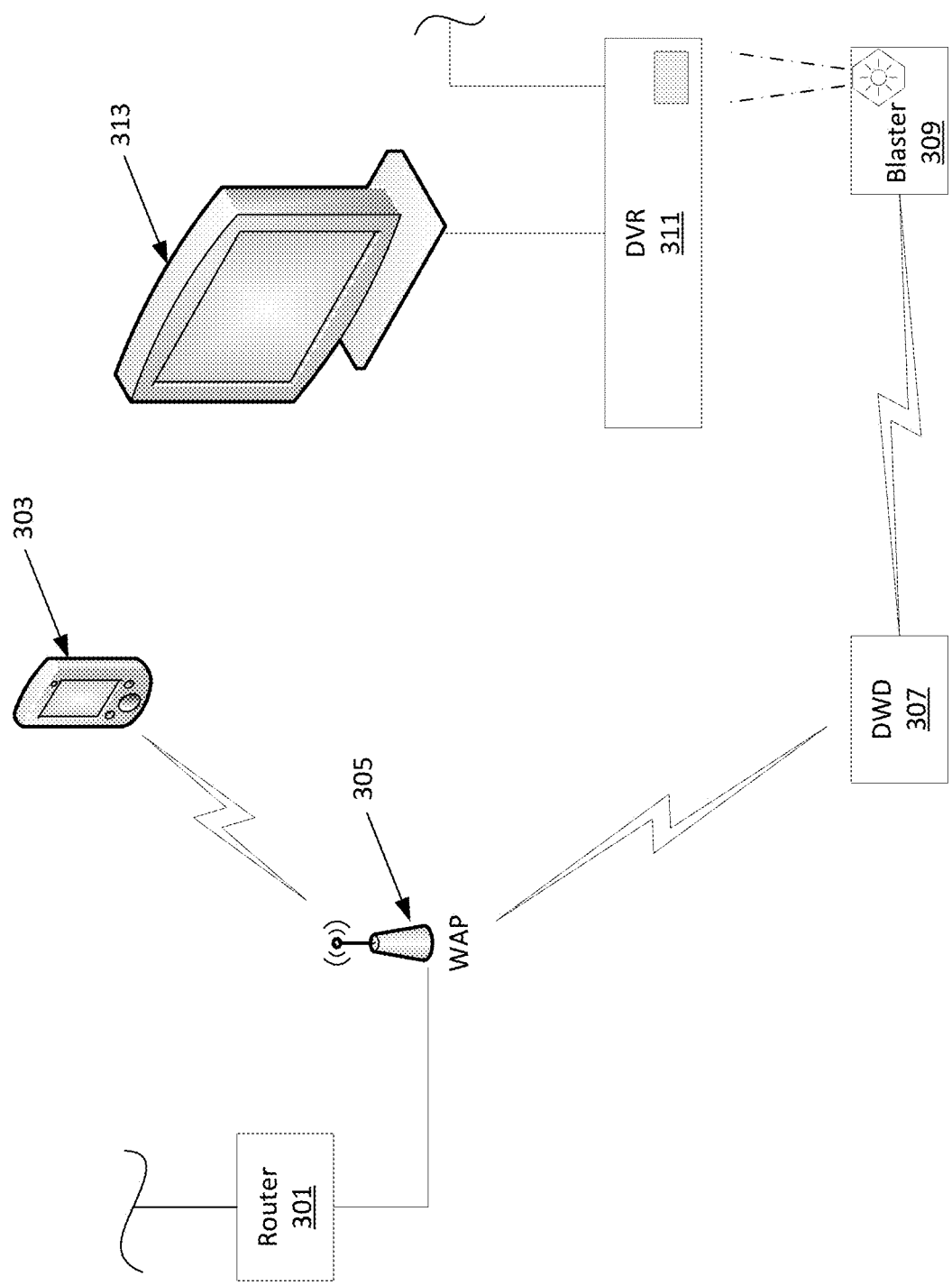
FIG. 3 illustrates an example communication network that includes a dependent wireless device, a wireless access point, and a host device.

Various features described herein may allow devices, even simple ones lacking user interfaces, to connect to a wireless network. FIG. 3 illustrates an architecture of devices that may be utilized in some embodiments to connect a device, such as an infrared blaster, RF device, or other wireless device, to a wireless network. This would allow other devices connected to the wireless network to use the wireless device, such as an IR blaster or RF device, to cause commands (e.g., infrared commands) to be sent using the IR blaster or RF device. A user device, such as a smartphone, may connect to the network and send a command to cause the infrared blaster or RF device to send a predetermined command. The example setup of devices illustrated in FIG. 3 will now be described in further detail.

Router 301 (e.g., a cable modem, a fiber optic termination unit, or any other network interface device) may provide network access for the devices associated with router 301. Router 301 may work in conjunction with one or more wireless access points (WAPs) 305, each WAP providing network access (e.g., Wi-Fi access) to wireless devices. WAP 305 may be a component of router 301 or may be a separate component of the network. Both router 301 and/or WAP 305 may provide access to a first wireless network.

Host device 303 may comprise any device that has access to the wireless network of WAP 305 and has a user interface. This user interface may include a display, touch screen, and/or keys or buttons with which a user may enter information. Host device 303 may be, for example, a laptop computer, notebook, tablet, netbook, or smartphone. Host device 303 may connect to WAP 305 through several ways (e.g. a network identifier, such as an SSID and password, a push-button method, a near-field-communication (NFC) method, etc.). If connection is via NFC or push-button, host device 303 might not have a user interface.

Host device 303 and WAP 305 may be enabled with push-button connection technology. A user may press a button located on the WAP 305 (or another network device, such as a router) and also press a button located on the host device 303 within a certain time frame (e.g. 30 seconds) in order to manually connect WAP 305 and host device 303. Host device 303 and WAP 305 may also be enabled with NFC, which would allow an exchange of network credentials to occur when host device 303 and WAP 305 are within a particular distance of one another (e.g. half a meter). In this example, host device 303 may include an NFC chip having read (and optionally write) capabilities, allowing it to read (and optionally write) tags and receive (and optionally transmit) information when in close proximity to a similarly enabled device. Additionally, host device 303 may have an NFC tag, allowing it to transmit or receive information even without power. A user may use host device 303 to communicate with a wireless device, such as DWD 307, over the wireless network associated with WAP 305 or a separate (e.g., local) wireless network.

DWD 307 might desire and/or request assistance in connecting to an access point. For example, DWD 307 might not have a user interface (e.g., display and keyboard functionality). In this example, a user might not be able to enter network identifying information or a password into DWD 307 in order for DWD 307 to connect to the wireless network (e.g., via an access point). DWD 307 may have push-button technology allowing it to take advantage of the push-button-method described above to connect to host device 303. DWD 307 may also have the NFC capabilities discussed above. Alternatively, DWD 307 may connect to host device 303 using any type of communication protocol, such as infrared, visible light, thermal communications, vibration communications, ultrasonic communications, and/or GPS. DWD 307 may additionally attempt to connect to any access point or host device 303 by sending announcement messages indicating that it desires assistance to connect to a wireless network. The messages may include information such as device type, model, communication capabilities, identification code, address, etc. of DWD 307. The information may be included in the announcement message in metadata or flags.

If DWD uses a low power wireless communication protocol, such as ZigBee, Bluetooth, or other radiofrequency (RF) protocol, DWD 307 may attempt to pair with another RF compliant device (e.g. a DVR 311 or another DWD) over a ZigBee or Bluetooth compliant network. This connection can be made wirelessly, by the push-button-method, NFC, or via discovery requests. A connection request may comprise a packet transmitted from DWD 307 to DVR 311 via, for example, infrared or RF. An RF discovery request may be similar to a Dynamic Host Configuration Protocol (DHCP) request in that DWD 307 attempts to determine which devices it can connect to. The discovery request may identify the type of device DWD 307 is (e.g., a device without a user interface that desires assistance connecting to an access point) and include instructions for responding to the discovery request. Any device that is on the ZigBee or Bluetooth compliant network, such as DVR 311, may send a discovery response indicating that DWD 307 may pair with that device. Such devices might only respond with a discovery response if they are compatible with DWD 307 (e.g., uses the same communication protocol as DWD 307).

If multiple devices respond, DWD 307 may choose which device to connect to based on various parameters, including the length of time the other device has been online, the number of devices with which the other device has been paired, and/or an infrared packet identifying the proximity or distance of the other device to DWD 307. DWD 307 may select the device to connect to based on the relative signal strengths of each device. For example, DWD 307 may select the device with the strongest received signal strength (as detected in a discovery request or response message). Alternatively, the selection may be based on how well a particular pair of devices matches. For example, devices that ship together to consumers in a self-install kit are likely to be used together and thus match well. Once DWD 307 has selected a device, such as DVR 311, to connect to, DVR 311 may request authentication of DWD 307 from a user. For example, DVR 311 may produce, on a display 313, a request for a particular user input in order to connect DVR 311 to DWD 307. The user may input the correct characters or produce the correct motions in order to complete the connection of DWD 307 to DVR 311.

DWD 307 may act as a bridge between multiple wireless networks. For example, DWD 307 may be programmed to convert signals from ZigBee compliant networks (e.g., RF4CE or ZigBee Pro) to Wi-Fi networks and vice versa. In doing so, DWD 307 may act as a bridge between any user device connected to the Wi-Fi network, such as host device 303, and a ZigBee compatible device, such as DVR 311 or another DWD.

DWD 307 may optionally communicate with DVR 311 or display device 313 with the help of a blaster 309. Blaster 309 may convert a first type of RF signal (e.g., ZigBee) to a second type of RF signal (e.g., 802.11) or to infrared signals in order to communicate with devices that accept the second type of RF signal or infrared signals, but not the first type of RF signal. Devices that accept infrared (or the second type of RF) signals may include STBs, TVs, DVD players, Blu-ray players, VCRs, DVRs (e.g., DVR 311), and the like. Additionally, DWD 307 may communicate directly with DVR 311, without using blaster 309 if DVR 311 supports ZigBee signals. Furthermore, multiple DWDs may exist in a single premise. While the foregoing has been described in the context of a blaster that converts between ZigBee and IR signals, any type of converter that can convert between two different protocols may be used. For example, a converter that converts between Bluetooth and Wi-Fi (e.g., if DVR 311 is Bluetooth-enabled and DWD 307 is Wi-Fi-enabled) may be used.

As discussed herein, a DWD's accessibility to the wireless access point (and associated wireless network), can be simplified and without prolonged disconnection of a host device from the wireless network.

Figure 4:
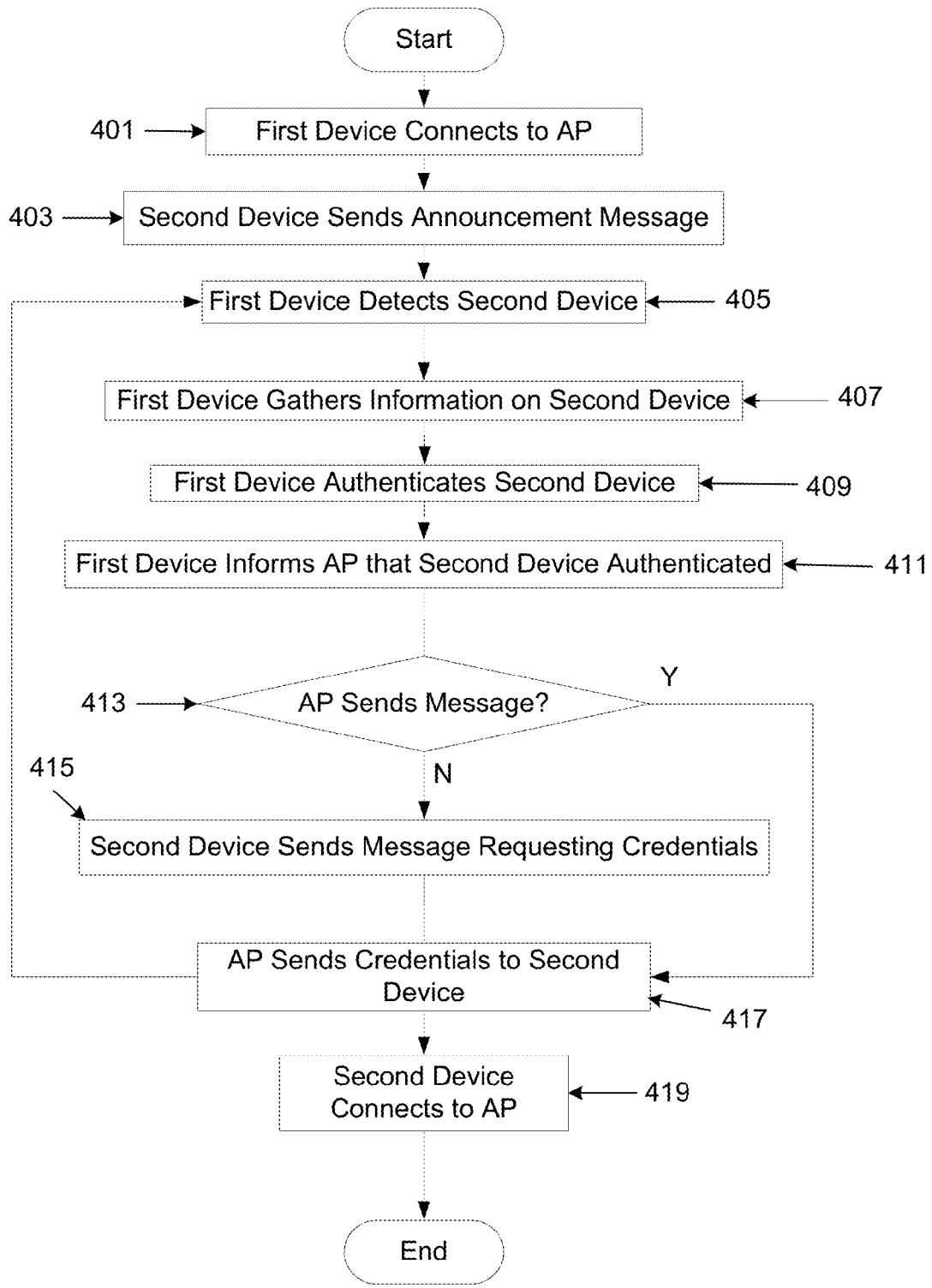
FIG. 4 illustrates an example method of connecting a wireless device to a network using another device.

FIG. 4 illustrates an example method of connecting a wireless device, such as DWD 307, to a network via an access point, such as WAP 305, using another device such as host device 303. In step 401, a first device, such as host device 303, connects to an access point, such as WAP 305, through any one of the methods described above (e.g. manual entry of SSID and password, push-button-method, NFC, etc.). Once first device 303 is connected to WAP 305, first device 303 may scan for wireless devices (e.g., DWDs 307) attempting to connect to either first device 303 or to WAP 305.

In step 403, a second device, such as DWD 307, may attempt to connect to an access point to gain wireless access. For example, second device 307 may send announcement messages indicating that second device 307 desires to connect to an access point and that it requests assistance to do so. These messages may be sent one or more times, such as periodically. In some aspects, second device 307 may first attempt to connect to WAP 305 directly. However, as discussed above, second device 307 might lack the ability to connect directly because it does not have an interface by which it can prompt a user for a password used to sign on to the wireless network or might lack push button or NFC capabilities. In step 405, as first device 303 scans the area, it may receive the announcement message and detect second device 307 as a device that desires assistance connecting to an access point.

In step 407, first device 303 may gather information on second device 307 from the announcement message. This information may identify characteristics of second device 307, such as device type, model, communication capabilities, identification code, address, signal strength from second device 307, etc. First device 303 may acquire this information through the metadata or flags included in the announcement messages. The announcement message may also inform first device 303 for what purpose second device 307 wishes to connect to a wireless network. For example, second device 307 may act as bridge between wireless networks and be capable of converting signals compatible with one wireless network to be compatible with another.

In step 409, first drive 303 may authenticate second device 307 using information included in the announcement message. By authenticating second device 307, the first drive 303 may determine that second device 307 is permitted to connect to the wireless network. Alternatively, authentication might simply be a determination that first device 303 will assist in connecting second device 307 to a wireless network. Using an application or program executed on first device 303, authentication may be automatic. For example, information that second device 307 sends (e.g., in the announcement message or a subsequent message) may contain particular keywords or other information used to authenticate second device 307. Additionally or alternatively, first device 303 may request user input for authentication. For example, first device 303 may prompt the user to provide additional information identifying second device 307 or provide an acknowledgement to authenticate second device 307.

In some aspects, authentication may involve first device 303 comparing information received from second device 307 with stored information identifying devices or device types that are to be granted (or denied) access to WAP 305. For example, first device 303 may comprise a tablet computer or smartphone loaded with a home security application that stores information identifying various home security sensors or sensor types for access to the wireless network (or otherwise commonly used with the home security system). First device 303 may also determine whether to authenticate second device 307 based on the signal strength of the announcement message(s). First device 303 may also display a user interface, such as a popup window, informing the user that second device 307 wishes to be authenticated and connect to WAP 305. The U/I may also display information for second device 307, such as identification of second device 307, identification of second device 307's signal strength, etc. The user may then decide whether to authenticate second device 307 and input the decision into first device 303. In some aspects, first device 303 may present a list of devices requesting to connect to WAP 305, and the user may then select one or more of the devices to authenticate.

In step 411, first device 303 may inform WAP 305 that second device 307 has been authenticated. The message to WAP 305 may be sent via Wi-Fi, through NFC, etc. This message may include information such as the address (e.g., MAC address) of second device 307 and/or a cryptographic challenge. First device 303 may maintain black or white lists for access points whose signals first device 303 receives. For example, second device 307 may inform first device 303 which APs the second device 307 can see (i.e., APs within second device 307's range). First device 303 might only authenticate second device 307 to APs that second device 307 can see. First device 303 may also maintain a list of which access points second device 307 should connect to (e.g., WAP 305). Based on the list(s), first device 303 may select WAP 305 as the access point to which to send an authentication message.

Once authenticated, second device 307 may be permitted to communicate with WAP 305 in order to use the wireless network. In step 413, WAP 305 may determine whether to send a message to second device 307 with the credentials for connecting to WAP 305. If so, the message may be sent through any network or communication medium that second device 307 is connected to or configured to connect to before being authorized by the WAP 305 to use the WAP's network. WAP 305 may have determined the address of second device 307 through information sent in the authentication message from first device 303. In step 419, second device 307 may connect to WAP 305 using the credentials.

If WAP determines not to send the credentials in step 413, second device 307 may determine that it does not have the credentials and in step 415 send a request for credentials to WAP 305. In some embodiments, second device 307 may periodically send requests to connect to the wireless network. WAP 305 may recognize second device 307 the next time second device 307 sends a request. In step 417, WAP 305 may send network credentials to second device 307 in response to the request. As previously discussed, the credentials may be sent through a network or communication medium that second device 307 is connected to or configured to connect to.

In some aspects, WAP 305 may permit second device 307 to connect to the wireless network without a password for a limited purpose such as, to do a key exchange. Once connected, WAP 305 may exchange keys with second device 307 (e.g., at a Wi-Fi Protected Setup level or other secured connection). Second device 307 might have limited connectivity to the network until it receives a password from WAP 305. During limited connectivity, second device 307 might only be permitted to send and receive messages to and from first device 303. After WAP 305 sends credentials to second device 307, second device 307 may use the credentials (e.g., network identifier and/or password) to access the network in step 419.

Once second device 307 has been authenticated and/or connected to the wireless network, first device 303 may continue scanning for other wireless devices desiring to connect to first device 303 and/or WAP 305. As such, first device 303 may loop back to step 405 illustrated in FIG. 4. Alternatively, first device 303 may stop scanning for wireless devices after second device 307 has been authenticated or connected to the wireless network. In some aspects, the second device 307 may instruct the first device 303 to keep scanning or to stop scanning. The first device 303 may alternatively pull this information from another device, such as a gateway device or the cloud. For example, information which may be stored in the cloud may indicate that a particular user or customer has purchased two dependent (second) wireless devices. If only one of those second devices has been set up, the first device 303 may continue to scan for other second devices. When both second devices have been connected to one or more wireless network, first device 303 may be instructed to stop scanning for additional devices.

In some aspects, first device 303 may detect second device 307 using NFC in addition to or scanning, as previously discussed. In such a case, the user of first device 303 may place first device 303 within a certain proximity of second device 307 (or vice versa) in order to perform the steps of exchanging information illustrated in FIG. 4.

Figure 5:
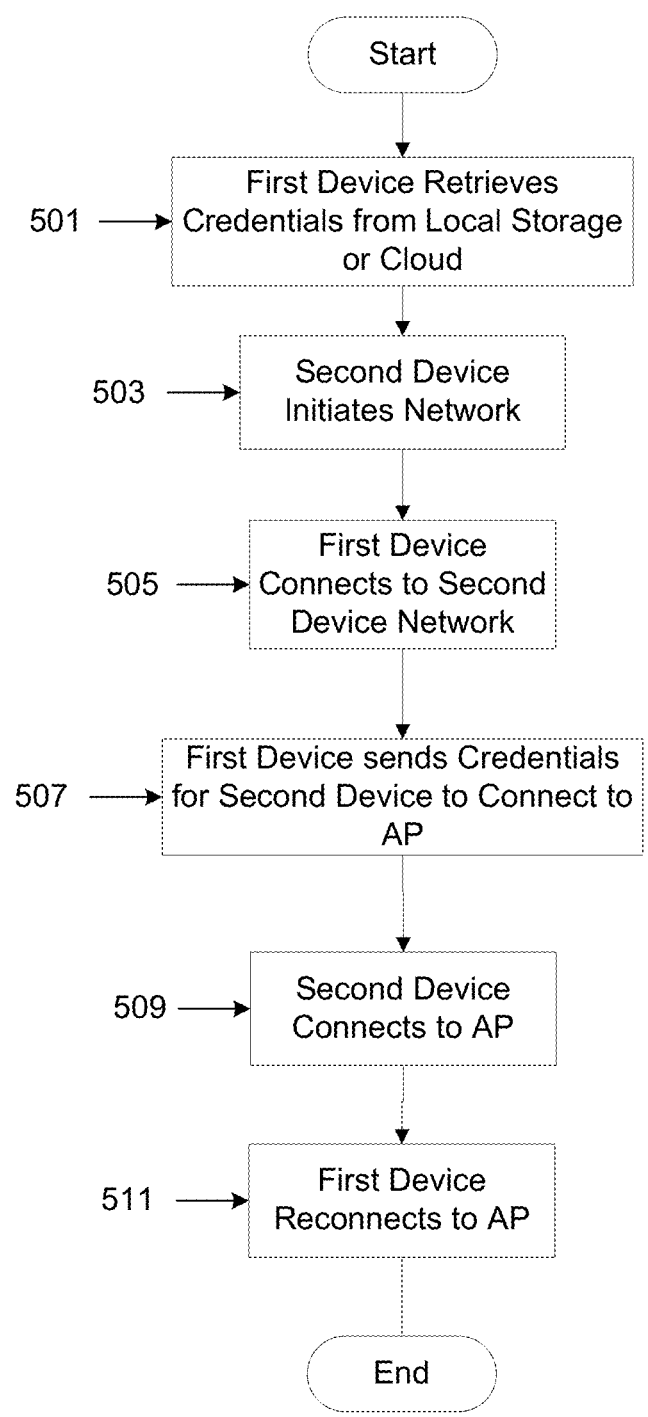
FIG. 5 illustrates another example method of connecting a wireless device to a network using another device.

FIG. 5 illustrates an example method where first device 303 sends information, such as, the necessary credentials, to second device 307 through a network initiated by second device 307. In step 501, first device 303 may retrieve credentials used to connect to WAP 305 (e.g., network identifier and password) from local storage, the cloud, or any other location. If the credentials are stored in the cloud, first device 303 may connect to a cloud based network and retrieve saved credentials for WAP 305 or the associated wireless network. For example, if an application running on first device 303 is a home security application or a remote control application, the application may save the credentials in a user profile set up for the user of first device 303 in the cloud based network. The application may subsequently access those credentials from the cloud when second device 307 desires to connect to WAP 305.

In step 503, second device 307 may initiate its own network and/or send an announcement message on the initiated network, as described above. This message may include a request for first device 303 (or other first devices receiving the announcement) to join a separate wireless network. WAP 305 might not be connected to second device 307's separate wireless network or otherwise associated with the network. In some embodiments, steps 503 and 501 might be reversed. For example, the first device 303 might retrieve the credentials only after second device 307 sends an announcement message.

In step 505, first device 303 may connect to the network initiated by second device 307. First device 303 may authenticate second device 307 and/or its network using any of the procedures described above (e.g. metadata, flags, etc.). Once first device 303 authenticates and recognizes that second device 307 is attempting to WAP 305's network, first device 303 may send or display a message (or popup window) to the user of first device 303 indicating that first device 303 wishes to momentarily switch from WAP 305's network to second device 307's network. That message may request, for example, that the user press a key or bring first device 303 to within a particular distance from second device 307 to initiate NFC communications. Alternatively, first device 303 may automatically terminate connectivity to WAP 305's network and join the network initiated by second device 307. In some embodiments, first device 303 might not disconnect from WAP 305's network and instead connect to both WAP 305's network and the network initiated by second device 307.

In step 507, first device 303 may send, over second device 307's network, credentials for connecting to WAP 305's network. In step 509, second device 307 may connect to WAP 305 using the received credential. In step 511, first device 303 may reconnect to WAP 305 if it previously disconnected from WAP 305. The example method illustrated in FIG. 5 may take a small amount of time and may appear seamless to the user of first device 303.

Figure 6:
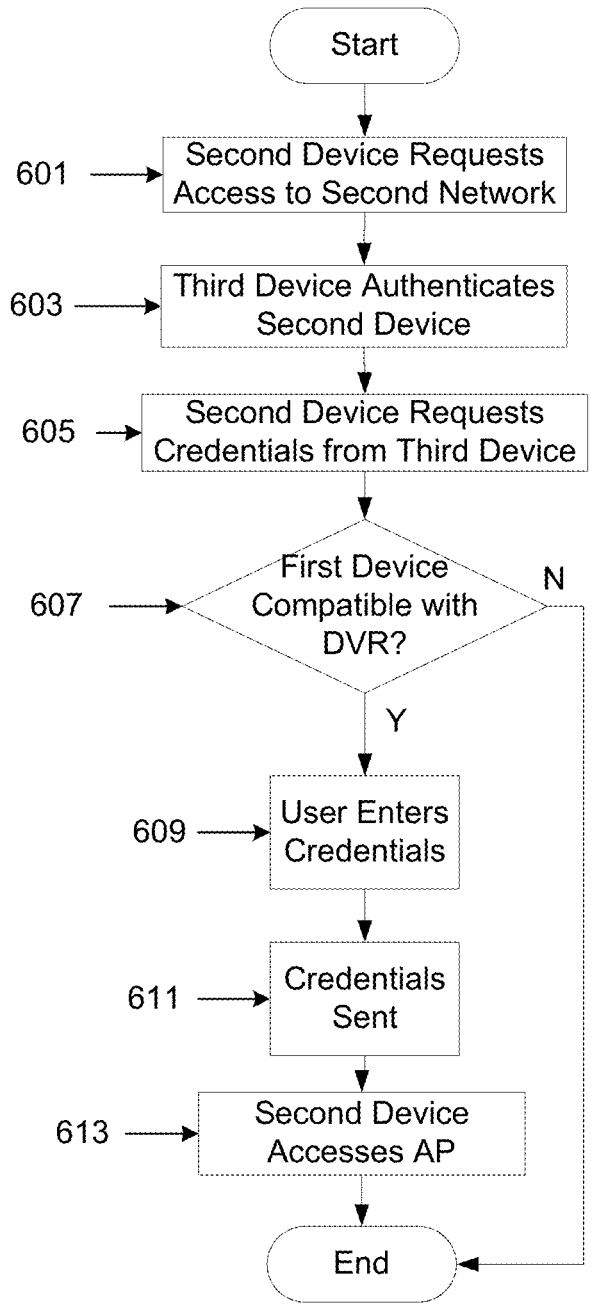
FIG. 6 illustrates an example method of allowing a wireless device access to a network using another device.

FIG. 6 illustrates an example method of allowing second device 307 access to a network via WAP 305 using another device, such as DVR 311. Second device 307 may receive credentials for accessing a first wireless network (e.g., WAP 305's wireless network) from a device on a second wireless network (e.g., a ZigBee compliant network, such as RF4CE). In step 601, second device 307 may request access to the second network. As discussed above, second device 307 may, for example, transmit announcement messages requesting access to the second network. These messages may contain metadata or flags including information identifying second device 307. One or more devices may be connected to the second network, such as a third device or DVR 311. DVR 311 may receive the announcement message(s) sent by second device 307. Prior to DVR 311 permitting second device 307 to join the second network, DVR 311 may determine its compatibility with second device 307.

In step 603, a device such as a DVR 311 may authenticate second device 307 and thus permit second device 307 to connect to the second network. Authentication was previously discussed, but will be summarized here. DVR 311 may authenticate second device 307 based on the information in the announcement message, such as the address (e.g., MAC address of second device 307). DVR 311 may additionally or alternatively authenticate second device 307 based on the signal strength of the announcement message. By testing the signal strength (e.g., comparing it to a threshold signal strength), DVR 311 might only permit a second device to connect to the second network if it is within a particular distance or radius of DVR 311. The signal strength threshold may be adjusted to ensure that DVR 311 and second device 307 are in the same room for example. In some aspects, DVR 311 may use display 313 to communicate with a user of DVR 311 in order to authenticate second device 307. For example, display 313 may display a prompt for user input, such as characters or motions using a remote control associated with DVR 311. In some aspects, second device 307 and DVR 311 may be paired (and thus second device 307 authenticated) through the push-button-method or NFC technology. Once DVR 311 authenticates second device 307, DVR 311 may permit second device 307 to join (or otherwise connect to) the second network. As discussed above, second device 307 may communicate directly with DVR 311 or indirectly with the assistance of blaster 309.

In step 605, second device 307 may request credentials for the first wireless network (associated with WAP 305) from DVR 311. This request may be made through any of the methods discussed above, including using the second wireless network. In step 607, DVR 311 may determine whether there is a device compatible with DVR 311 that can act as a first device. In some embodiments, steps 605 and 607 may be performed in reverse. For example, once second device 307 is connected to the second network (steps 601 and 603), DVR 311 may determine whether a compatible first device exists.

The compatible first device may be used to authenticate second device 307. Further, DVR 311 may determine whether the first device is suitable based on the ease with which a user can enter characters into the first device. For example, a user may enter credentials for connecting to the first network into a suitable first device, and the first device may transmit the credentials to second device 307. Ease of which the user can enter characters into the first device may be used to determine whether the first device is a compatible first device, as will be discussed in the examples below.

One example of a first device is a remote control. In step 607, DVR 311 may determine that certain remote controls (or types of remote controls) may be used as first devices while others might not. For example, DVR 311 may determine that a remote control with a keyboard is a suitable first device because of the ease with which a user may be able to enter credentials for the first network. On the other hand, DVR 311 may determine that a remote control without a keyboard is not a suitable first device. Similarly, DVR 311 may determine that a remote control with a touch screen (such as a smartphone) is a suitable first device. In some aspects, DVR 311 might determine that any remote control is suitable and simply configure input parameters based on the configuration of the remote control.

The remote control (or other first device) may interact with DVR 311 or display 313 connected to the DVR 311. DVR 311 may cause a keyboard to be displayed on display 313, which a user may use to input letters, numbers, and symbols. The user might also be able to point to a character on display 313 rather than typing it in. Other information may be displayed to the user. For example, display 313 may display a message indicating that a different remote control must be used as the first device in order to connect second device 307 to the second network. DVR 311/display 313 may ask the user whether the user wishes to continue using the current remote control and navigate the keyboard on display 313 using the remote control or whether the user wishes to switch to a different remote control. Messages displayed to the user may also suggest other ways in which second device 307 can connect to the first network, such as any of the methods described above.

If DVR 311 detects a compatible first device (e.g., first device 303), DVR 311 may display on display 313 a request for the user to select an access point and/or networks for second device 307 to connect to and enter credentials for the access point and/or network. In step 609, the user may select, for example, WAP 305 as the access point and/or enter credentials for WAP 305 using input capabilities of first device 303. In step 611, first device 303 (e.g., a remote control device) may enter into a dual remote mode during which anything a user inputs (e.g., types) into first device 303 (e.g., via buttons, a keyboard, etc.) may be displayed on display 313 and also transmitted to second device 307 by the single user action. The transmission may be made from DVR 311 to second device 307. In some embodiments, anything the user types into first device 303 may be displayed on display 313 and also transmitted to WAP 305 (through DVR 311 or directly from first device 303). When the credentials are entered, they may be visible on display 313 to the user or may be hidden with each input of a character. For example, display 313 may display an X or a dot rather than the character for security purposes.

In step 613, second device 307 may access WAP 305 using the received credentials. Types of connections were previously discussed and are summarized here. For example, once second device 307 has the credentials, it may send a message to WAP 305 with the credentials. Based on the credentials, WAP 305 may permit second device 307 to join the first network. Subsequently, second device 307 may disconnect from the second network used to communicate with DVR 311. Alternatively, second device 307 may remain connected to both networks. Consequently, second device 307 may act as a bridge between the first network and second network and assist a device connected to the first network to communicate with a device connected to the second network.

Figure 7:
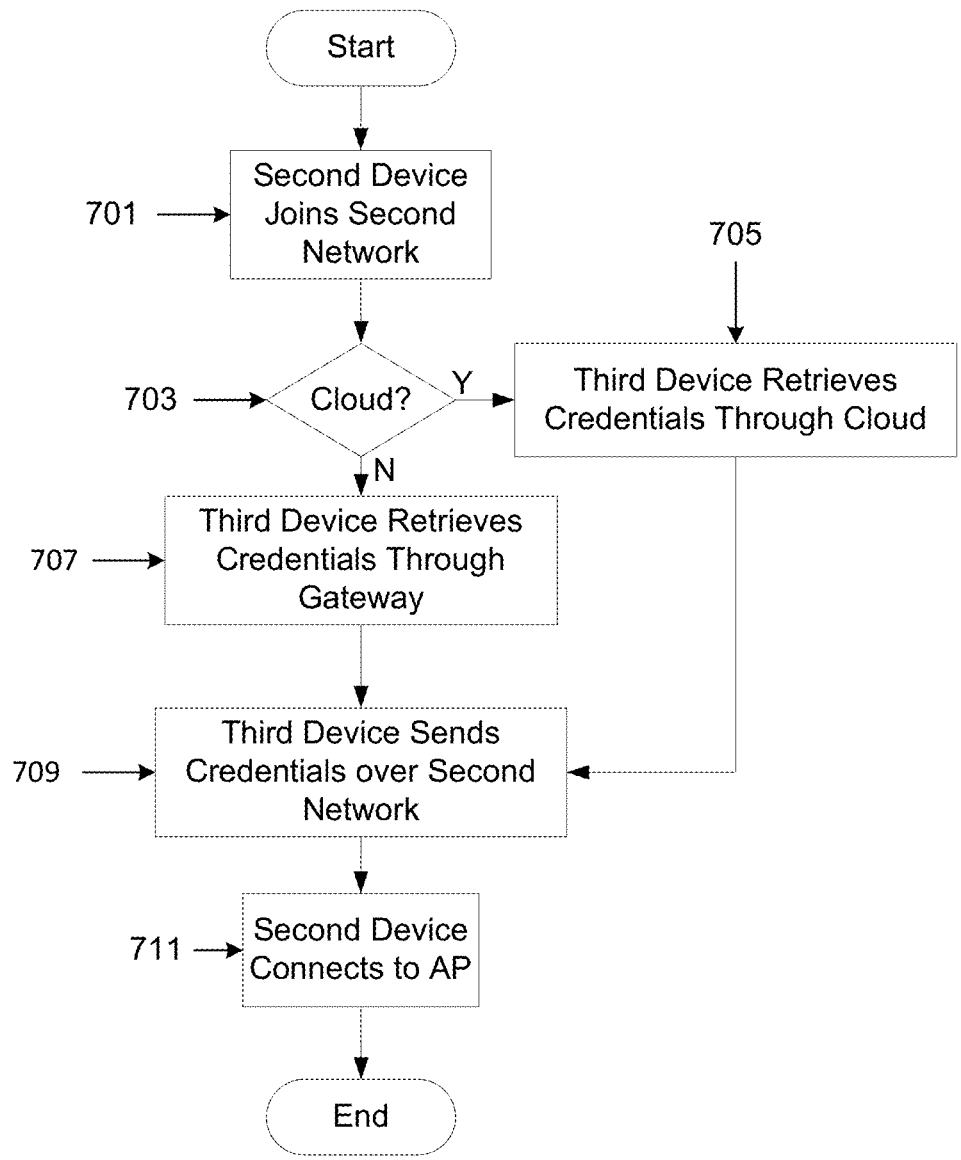
FIG. 7 illustrates an example method of connecting a wireless device to a network using credentials provided through another source.

FIG. 7 illustrates an example method of connecting a wireless device to a network via an access point using credentials provided through a source, such as a gateway or cloud. In some embodiments, a third device, such as a DVR need not wait until it detects the second device's request on the second network. Instead, the DVR may actively broadcast credentials securely on the second network for any device connected to the second network and/or desiring to connect to the first network.

In step 701, second device 307 may join the second network, using any of the methods described above (e.g., by user authentication, through the use of metadata and flags, the push-button-method, NFC, etc.). As previously discussed, DVR 311 may determine whether a compatible first device exists. Once DVR 311 determines that second device 307 wishes to connect to the first network and identifies a compatible first device (e.g., first device 303), DVR 311 may send a message to first device 303 and/or display 313 to indicate to the user that second device 307 wishes to connect to the first network. DVR 311 may automatically connect to second device 307 after second device 307 sends the announcement message. Alternatively, DVR 311 may determine that second device 307 is compatible with DVR 311, before permitting second device 307 to connect to DVR 311 or access the second network. As previously discussed, second device 307 and DVR 311 may be paired through NFC if second device 307 is brought to within a particular distance from DVR 311 (or vice versa). DVR 311 and second device 307 may also be connected using the push-button-method.

In step 703, DVR 311 may determine whether to retrieve credentials for the first network from the cloud. For example, DVR 311 may determine whether it is connected to a cloud network, the cloud network including a computing device located outside of, or remote from, first device 303 and the premises illustrated in FIG. 3. DVR 311 may also determine whether the computing device or cloud stores the credentials.

In step 705, DVR 311 may retrieve the credentials from the cloud network if available. A variety of methods, such as DOCSIS or other communication standard, may be used to access the credentials over the cloud. Alternatively, in step 707, DVR 311 may retrieve the credentials from gateway 111 or a router if they are available from gateway 111 or if they are not available from the cloud. DVR 311 may locally retrieve the credentials using any of a variety of methods. For example, DVR 311 may be connected to a MoCA interface also connected to gateway 111. DVR 311 may then retrieve the credentials from gateway 111 through a protocol such as HNAP. If a wireless ECB exists in premises 102a and extends the first wireless network over MoCA, DVR 311 may retrieve the credentials from gateway 111 through the ECB, using a protocol such as HNAP.

In step 709, DVR 311 may send the retrieved credentials (from the cloud or gateway) to second device 307 over the second network. Additionally or alternatively, the second device 307 may pull the credentials from DVR 311 or from the cloud. This transmission may be done with or without the assistance of blaster 309, as previously discussed. Alternatively, DVR 311 may transmit the credentials through NFC or any of the variety of methods discussed above. In step 711, second device 307 may connect to WAP 305 using the credentials.

Figure 8:
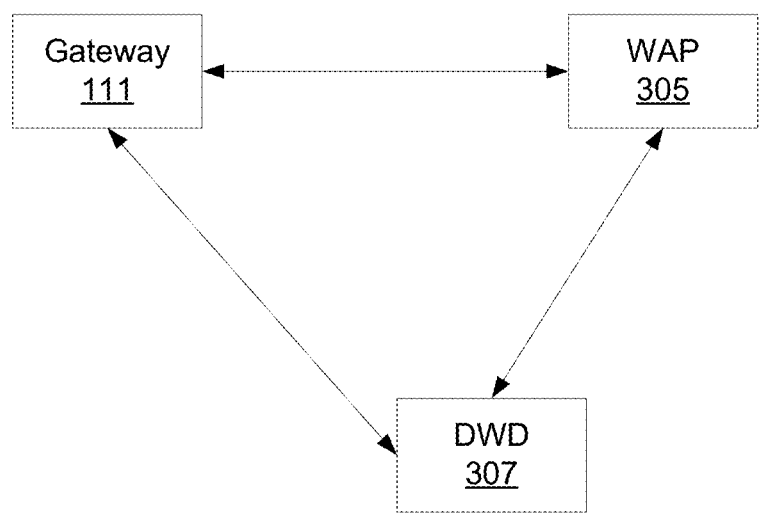
FIG. 8 illustrates an example setup of devices.

FIG. 8 illustrates an example setup of devices, such as a gateway, access point, and wireless device. In this example, second device 307 may connect directly to gateway 111 (which may have its own wireless access point and associated wireless network) in order to receive the credentials for accessing another network associated with WAP 305. Gateway 111 and second device 307 may join gateway 111's network and communicate using any of the methods previously discussed, such as sending announcement messages, push-button-technology, NFC, etc. Gateway 111 may retrieve credentials for connecting with WAP 305 and transmit those credentials to second device 307. Optionally, second device 307 may terminate or leave the gateway 111's network after second device 307 connects to WAP 305. Gateway 111 may also communicate directly with WAP 305 and its associated network.

Figure 9:
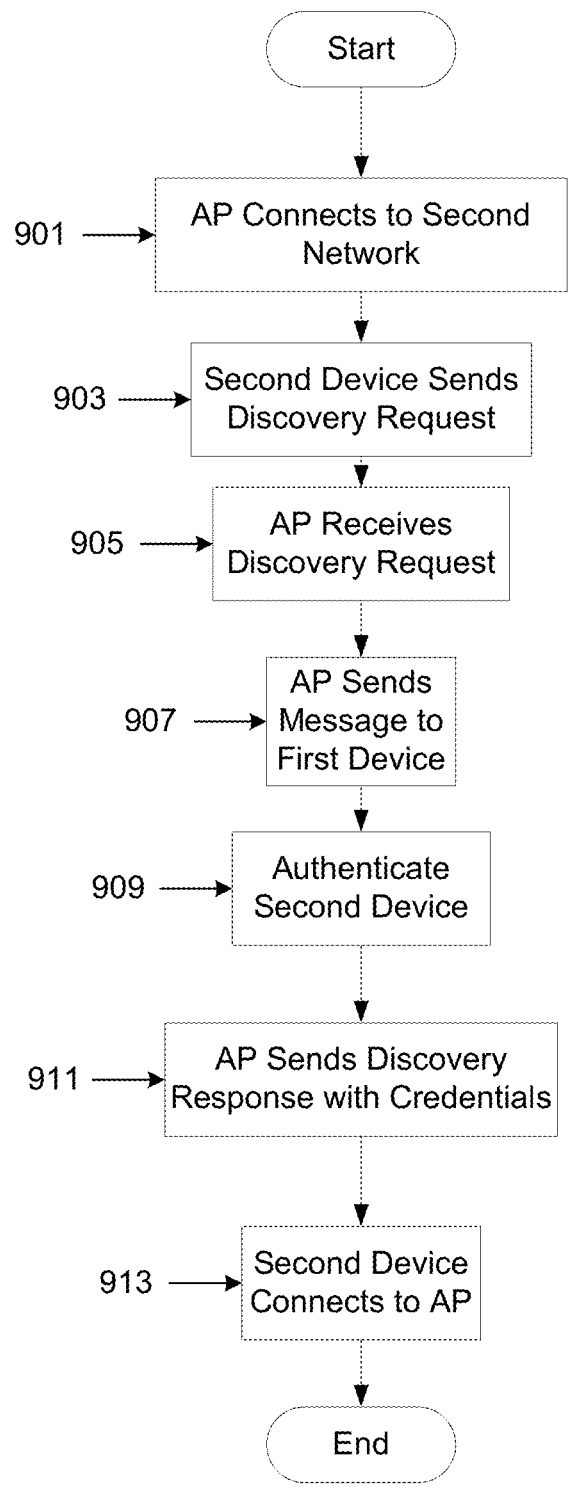
FIG. 9 illustrates an example method of connecting a wireless device in a multiple network environment.

In the above examples, second device 307 can communicate using two different networks and can receive credentials from a first device 303 or DVR 311 over one of the networks in order to access the other network. FIG. 9 illustrates an example method of connecting a wireless device in a multiple network environment. For example the wireless device may be connected to an access point, where the access point (rather than second device 307) is capable of connecting to two different networks. For example, WAP 305 may connect to two networks and use one of the networks to supply credentials to second device 307 for second device 307 to access the other network.

In step 901, WAP 305 may connect to a second network to which second device 307 is also connected. This network might or might not have been initiated by second device 307, as previously discussed. For example, the second network may comprise a ZigBee-compliant network, such as RF4CE or ZigBee Pro. WAP 305 may join the second network via any of the various methods described above (e.g. push-button-method, NFC, discovery requests). Prior to connecting to the second network, WAP 305 may have connected to the first wireless network (e.g., a Wi-Fi network).

WAP 305 might only connect to the second network on the command of a user. For example, a user may authenticate second device 307 using first device 303 or DVR 311, and second device 307 may communicate with first device 303 or DVR 311 in any one of the ways previously discussed (e.g., metadata or flags, a network initiated by second device 307, NFC, etc.). Once second device 307 is authenticated, first device 303 or DVR 311 may send, via the first network, a message to WAP 305 with instructions for WAP 305 to connect to the second network. The message may include credentials for connecting to the second network. WAP 305 can also connect to the second network without prompting from first device 303, DVR 311, or the user.

In step 903, second device 307 may send a discovery request, such as by broadcasting the request message. The discovery request may include an infrared packet to determine the distance/proximity of other devices, and instructions for responding to the request. For example, the request might indicate that the responding device should be a device of a certain type, such as a wireless access point (e.g., WAP 305). The request might also indicate that the responding device should be connected to (or can connect to) a Wi-Fi network. The request might also indicate that the responding device should be in communication (or be able to communicate) with a particular device or other type (e.g., first device 303) running a particular application or program. In step 905, WAP 305 may receive the discovery request.

In step 907, WAP 305 may send a message to first device 303 or DVR 311 indicating that second device 307 has sent a discovery request and/or otherwise desires to connect to WAP 305. In step 909, WAP 305 may wait for authentication of second device 307 before sending a discovery response to second device 307. Any of the first device 303, DVR 311, WAP 305, and/or a user of any of the devices may be used to authenticate second device 307. For example, WAP 305 may prompt first device 303 or DVR 311 to display a message (e.g., a pop-up window) to the user of first device 303, the message indicating that second device 307 is attempting to access WAP 305. The user of first device 303 may press a key or button or a series of keys or buttons on a user interface of first device 303, DVR 311, or any device to authenticate second device 307 or otherwise indicate that WAP 305 should send a discovery response to second device 307 with the credentials for connecting second device 307 to the first wireless network. Authentication by first device 303 or DVR 311 may alternatively be automatic, without using user input.

Alternatively, first device 303, DVR 311, or user may determine that second device 307 should not be permitted access to WAP 305. In that case, WAP 305 might not respond to the discovery request. WAP 305 may also send a discovery response to second device 307 indicating that WAP 305 will not permit access. First device 303, DVR 311, or a user may also request WAP 305 to disconnect from the second network.

Assuming second device 307 has been authenticated, WAP 305 may, in step 911, send a discovery response to second device 307 over the second network. The response may indicate that second device 307 is permitted to connect to WAP 305 and/or the first wireless network. The credentials may be sent with the discovery response or in a separate message.

In step 913, second device 307 may determine whether to connect to WAP 305. This decision may be made based on the signal strength of WAP 305 detected by second device 307 and/or based on an infrared packet indicating the proximity of WAP 305 to second device 307 sent with the discovery response. Based on the determination, second device 307 may use the credentials to connect to WAP 305 over the first wireless network.

Figure 10:
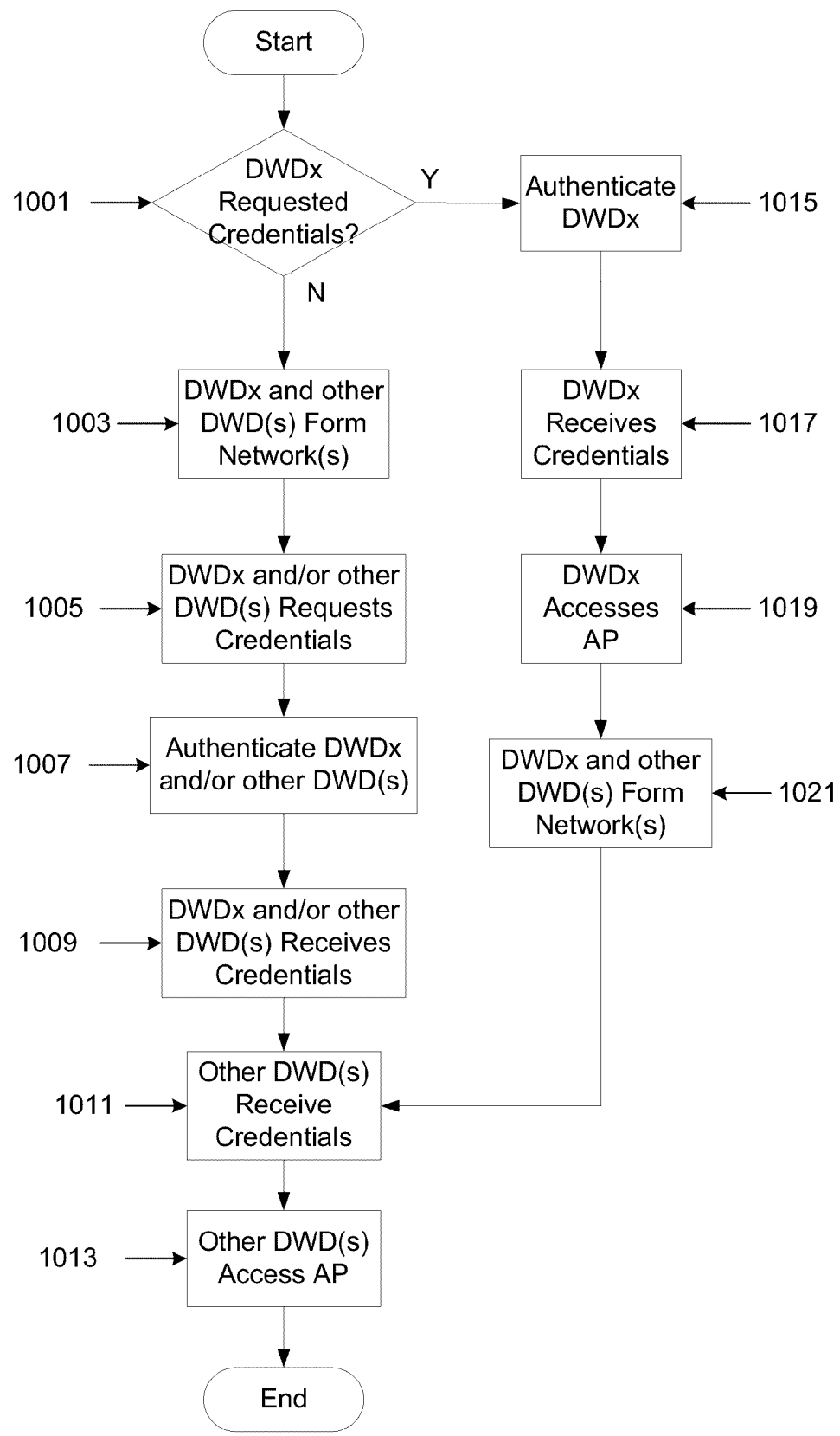
FIG. 10 illustrates an example method of a wireless device assisting other wireless devices to connect to a network.

Once the second device (e.g., DWD 307) is connected to the first network, DWD 307 may help other DWD's connect to the first network. FIG. 10 illustrates an example method of a device, such as a first DWD, assisting one or more other devices connect to the first network. In some aspects, the first DWD and other devices may form a network of wireless home security devices, such as a sensor array or group. The first DWD (e.g., "DWDx") might or might not have requested credentials to the first network. Examples of requesting credentials (or similarly requesting to connect to the first network) were previously discussed.

In step 1001, it may be determined whether DWDx requested the credentials. If not, in step 1003, DWDx and at least one other DWD may form a network, such as a ZigBee network. Alternatively, one DWD may generate a Wi-Fi hotspot, and the other DWD(s) may join the hotspot. This network may be secured by encryption keys shared by the DWDs forming the network. Alternatively, the network may remain open without using encryption.

An example of DWDx and at least one other DWD forming a network will now be described. DWDx and the other DWD(s) may connect to the same ZigBee network. In some embodiments, one of DWDx or the other DWD(s) may have initiated the ZigBee network. In such a case, DWDx may send messages, such as announcements, over a particular frequency indicating that it wishes to connect to other DWD(s). As previously discussed, the information may be sent as a discovery packet or as a message with metadata and flags. The information may be sent to other DWD(s) of the same type (e.g., make and model) only or to DWDs of different types. The information may be sent during a particular time window. For example, DWDx might send the information within X seconds of powering on. Other DWD (s) may have to be initialized (e.g., powered on) within Y seconds in order to connect to DWDx. Once the DWD(s) responds to DWDx's message or discovery request, a network with DWDx and the responding DWD(s) may be formed.

DWDx might be the only DWD sending announcement messages for connecting to other DWD(s). As such, the other DWD(s) might connect to the network solely through DWDx (and not other DWDs). Alternatively, all (or a portion) of the DWDs powered on within Z seconds of one other may send and receive announcement messages to the other DWDs and may stop sending announcement messages after T seconds. Thus, the other DWD(s) might not necessarily require DWDx to connect to the network. A network among DWDs may be formed using any of the other methods previously described, such as a push-button-method or NFC.

Host device 303, DVR 311, and/or a user of host device 303 or DVR 311 may initiate the network or assist the DWDs in initiating or connecting to the network. For example, host device 303 may determine that DWDx and the other DWD(s) wish to form a network. Host device 303 may authenticate the DWDs and permit them to form a network as described above after authentication.

In some aspects, DWDx and the other DWD(s) may form more than one network, each network encrypted with its own set of keys. Encryption is optional and one or more of the formed networks may be unencrypted. For example, DWDx may form a first network with DWD2. DWDx may form a second network with DWD3 and DWD4. In some aspects, a non-DWD device, such as a remote control, may form separate networks with each DWD, using any of the methods previously discussed. For example, the non-DWD device may be authenticated by host device 303 and/or DVR 311 and pair with each DWD.

In step 1005, DWDx or any of the other DWDs may request credentials for accessing WAP 305 or its associated network (i.e., the first wireless network) from host device 303 or directly from WAP 305 using any of the methods previously discussed. In some aspects, one DWD (such as DWDx or a different DWD) may request the credentials for accessing WAP 305 on behalf of all the other DWDs. For example, DWDx may request authorization to send the credentials to other DWDs. Alternatively, a non-DWD device (e.g., a remote control) may request the credentials for accessing WAP 305 on behalf of the DWDs.

In step 1007, prior to providing the credentials, DWDx and/or the DWD(s) requesting the credentials may be authenticated. As previously discussed, the authentication may comprise using the display and/or user interface capabilities of host device 303 (or DVR 311) to obtain user authorization to connect the DWDs to the first wireless network. As a brief example, host device 303 may comprise a smartphone loaded with a home security application. Upon detecting one or more wireless window sensor (e.g., DWDs), the smartphone may display a prompt to a user informing the user that a number of DWDs (and identify them by serial number) have been detected and that the sensors are requesting authorization to connect to or otherwise use the home wireless network.

In step 1009, DWDx and/or the requesting DWD may receive the credentials and connect to WAP 305 using the credentials. This access may be performed before or after forming the network(s) among DWDs (i.e., step 1003). In addition to receiving the credentials, DWDx may receive authorization to send the credentials to other DWDs for the other DWDs to connect to the network. The authorization may also identify a predetermined time window for DWDx to send the credentials to other DWDs, as will be described in further detail in the examples below. Several non-limiting examples will now be provided. DWDx may request the credentials, be authenticated, subsequently receive the credentials, and connect to the first network using the credentials. Alternatively, another DWD (DWDy) may request the credentials. Instead of authenticating DWDy, host device 303 (or another device) may authenticate DWDx and send the credentials to DWDx. This may be performed if it is determined that DWDx is to be used as the hub for providing the credentials to the other DWDs, such as DWDy. This may be done if it is determined that DWDx has greater functionalities than the other DWDs (e.g., the ability to connect to a greater number or different types of networks than the other DWDs).

In step 1011, DWDx (assuming it received the credentials) may transmit the credentials to the other DWDs using the network(s) formed in step 1003. DWDx might send the credentials to all other DWDs in its network(s). Alternatively, DWDx may send the credentials to a subset of the other DWDs, and the subset of the DWDs may propagate the credentials further to other DWDs. This would be especially useful if multiple networks were formed in step 1003 and if DWDx is not connected to all of these networks. A predetermined time window may be created for sharing the credentials among the DWDs. DWDx (or other DWDs that have the network credentials) may send the credentials to one or more other DWDs during the predetermined time window. In some aspects, DWDs may receive the credentials if they are activated (e.g., powered on, communicating with DWDx, etc.) within the predetermined time window. For example, DWDs that have not received the credentials within 3 seconds of DWDx receiving the credentials may be locked out of the first network. The locked-out DWDs may send individual requests to connect to the first network, or they may attempt to start from step 1003 as a group unto themselves. As previously discussed, each DWD might notify at least one other DWD, such as DWDx, of the access points within range of that DWD so that the DWD can receive credentials for a wireless network it can see (i.e., within range of the DWD) and not credentials for a wireless network it cannot see.

In some embodiments, WAP 305, host device 303, or DVR 311 may distribute the credentials directly to each DWD. There may be a limited time during which the credentials are distributed. Furthermore, steps 1009 and 1011 may occur in the opposite order. For example, DWDx may transmit credentials to other DWDs before DWDx itself accesses WAP 305. The non-DWD device (remote control) may also receive the credentials and distribute them to DWDs. In step 1013, each DWD may access WAP 305 once it has the credentials. The non-DWD device may also access the first network using the credentials.

If, in step 1001, it is determined that DWDx already requested the credentials, host device 303, DVR 311, or the user of host device 303 or DVR 311 may authenticate DWDx in step 1015. In step 1017, DWDx may receive the credentials once authenticated and access WAP 305 using the credentials in step 1019. In step 1021, DWDx and other DWD(s) may form one or more networks as previously described in step 1003. The process then may proceed to step 1011, as previously discussed.

Figure 11C:
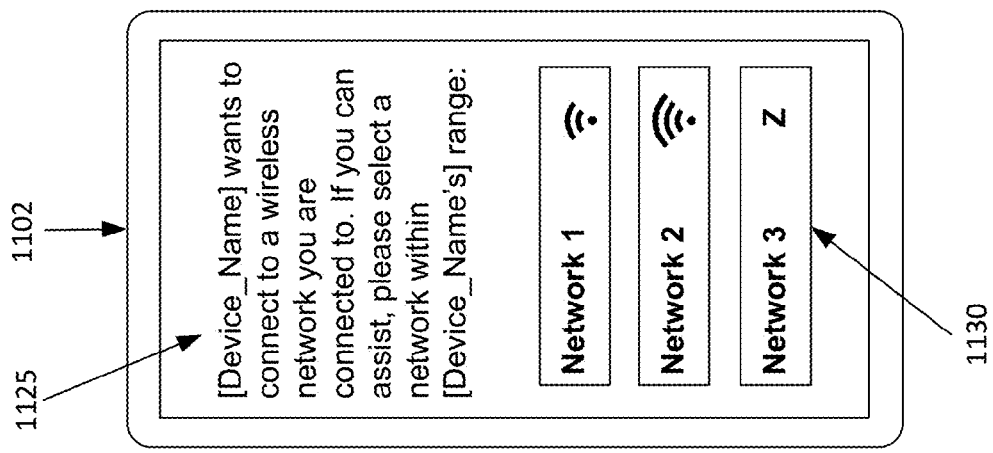
FIGS. 11A-C illustrate example user interfaces.
Figure 11B:
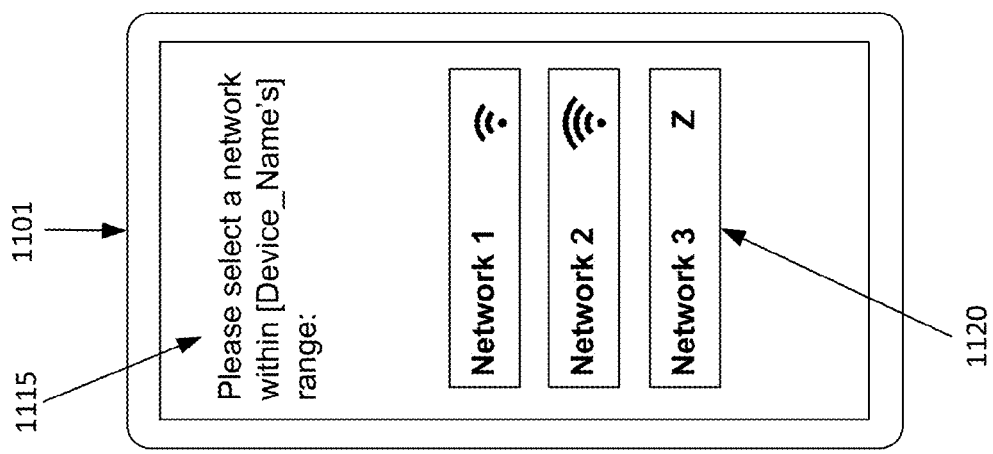
Figure 11A:
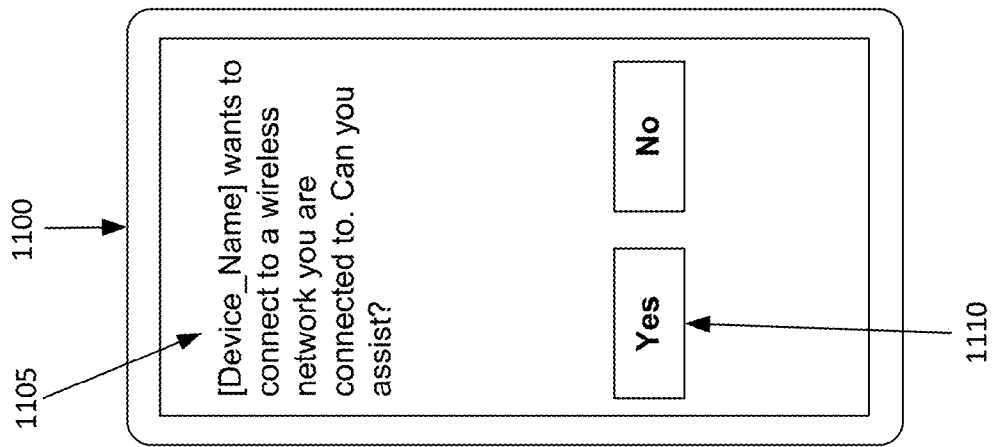

FIGS. 11A-C illustrate example user interfaces (e.g., GUIs) 1100, 1101, and 1102 displayed on a device, such as a first (host) device 303. The user interfaces 1100, 1101, and 1102 can be displayed on any device, such as a wireless device 116 (e.g., a mobile phone), a laptop computer 115, the display device 112, or any of the other devices discussed herein capable of displaying a user interface.

After a second (e.g., dependent) device 307 sends a request to the first device 303 requesting assistance to connect to a wireless network, the message 1105 in FIG. 11A may be generated and/or displayed on the display of the first device 303. For example the message 1105 might state "[Device_Name] wants to connect to a wireless network you are connected to. Can you assist?" The message might optionally indicate that the second device 307 does not have its own display, which is why the second device 307 is requesting assistance from the first device 303. Selectable options 1110 (e.g., "Yes" or "No") may also be generated and/or displayed, letting the user of the first device 303 decide whether to assist or not to assist the second device 307.

If the user decides to assist the second device 307, such as by selecting "Yes" button 1110 from the user interface 1100, the user interface 1101 may be generated and/or displayed on the first device 303. The user interface 1101 may include a message 1115 requesting the user to select a network within the range of the second device 307. As previously discussed, the second device 307 may indicate, in the request for the first device 303 to assist the second device 307, the wireless network(s) currently in the range of the second device 307. For example, selectable buttons 1120 for Network 1 (a Wi-Fi network with medium signal strength), Network 2 (a Wi-Fi network with strong signal strength), and Network 3 (a Zigbee network) may be generate and/or displayed.

Instead of displaying the two separate user interfaces 1100 and 1101 illustrated in FIGS. 11A and 11B, respectively, the first device 303 may generate and/or display the user interface 1102 illustrated in FIG. 11C. The user interface 1102 may include both a message 1125 indicating that the second device 307 requests assistance to connect to a wireless network and a listing 1130 (which may be selectable) indicating the networks currently in the range of the second device 307 (e.g., Networks 1-3). When the user selects one of the networks by pressing any of the selectable buttons 1120 and 1130, additional user interfaces may be generated and/or displayed on the first device, as will now be discussed.

Figure 12C:
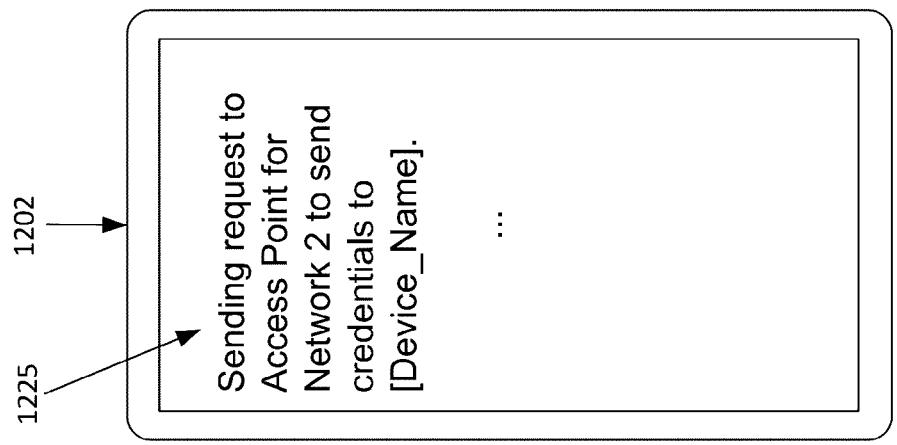
FIGS. 12A-C illustrate additional examples of interfaces.
Figure 12B:
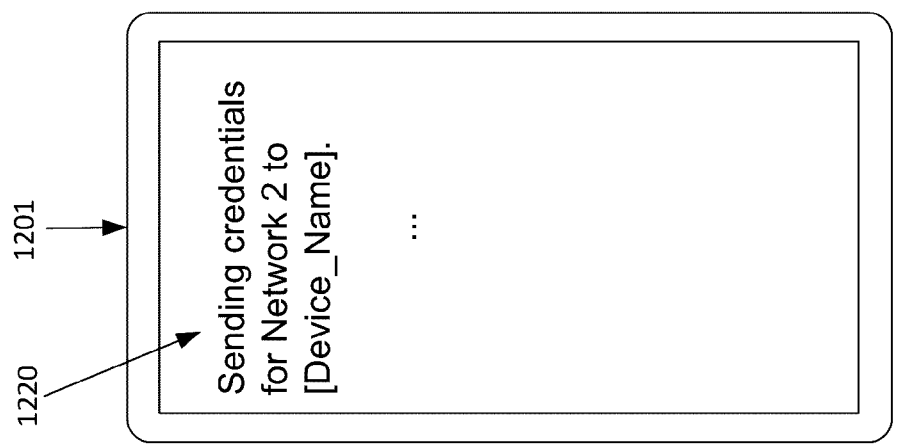
Figure 12A:
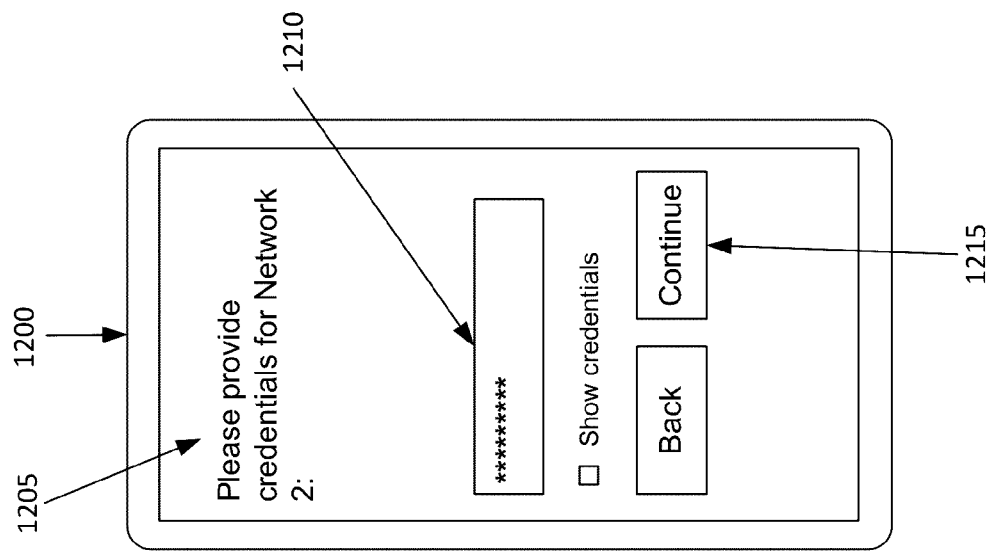

FIGS. 12A-C illustrate additional examples of user interfaces (e.g., GUIs) 1200, 1201, and 1202 displayed on a device, such as a first (host) device 303. The user interfaces 1200, 1201, and 1202 can be displayed on any device, such as a wireless device 116 (e.g., a mobile phone), a laptop computer 115, the display device 112, or any of the other devices discussed herein capable of displaying a user interface.

As previously discussed, a user might be prompted to provide credentials, such as a password, for the selected network (e.g., Network 2). In the example user interface 1200 illustrated in FIG. 12A, a message 1205 may request the user to provide credentials for Network 2. The message may also (optionally) indicate that the credentials will be sent to the second device 307. Using one or more input device for the first device 303 (e.g., touch screen keyboard, physical keyboard, voice recognition, etc.), the user may provide the credentials in the input field 1210. After the user selects the "Continue" button 1215, the credentials for Network 2 may be sent from the first device 303 to the second device 307. Furthermore, the user interface 1201 with the message 1220 may optionally be displayed after the user selects the "Continue" button. For example, the message 1220 may indicate that the first device 303 is "Sending credentials for Network 2 to [Device_Name]."

As previously discussed, the first device 303 might already know the credentials for Network 2, such as if the credentials were previously stored in the first device 303's local memory, if the first device 303 can retrieve the credentials from another network location, such as the Cloud, and/or if the first device 303 can otherwise access a clear text version of the credentials. In these examples, the first device 303 might not prompt the user for credentials and might instead directly generate and/or display user interface 1201 without displaying interface 1200 when the user selects a network in user interface 1101 or 1102.

As also previously discussed, the first device 303 may send a request to have Network 2 (or an access point of Network 2) directly send the credentials to the second device 307 (or have Network 2 directly connect to the second device 307). This example is illustrated in the user interface 1202 illustrated in FIG. 12C. In particular, a displayed message 1225 may state, for example, "Sending request to Access Point for Network 2 to send credentials to [Device_Name]." When the credentials or request to send credentials has been sent, the first device 303 may exit from display 1201 or 1202, respectively.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

We claim:

1. A method, comprising:
    connecting, via an access point of a wireless network, a first device to the wireless network;
    determining a time window for the first device to assist other devices to connect to the wireless network;
    receiving, by the first device and from a second device, a request for assistance to connect the second device to the wireless network; and
    transmitting, to the second device and during the determined time window, information to connect the second device to the wireless network for wireless communications between the second device and the wireless network.

2. The method of claim 1, further comprising authenticating, by the first device, the second device prior to performing the transmitting.

3. The method of claim 2, wherein the authenticating comprises prompting, on a display of the first device, a request for user permission to permit the second device to connect to the wireless network.

4. The method of claim 1, wherein the information to connect the second device to the wireless network comprises credential information for the wireless network, the method further comprising:
 receiving, from a user and at an interface of the first device, the credential information,
 wherein the transmitting comprises the first device transmitting the credential information to the second device.

5. The method of claim 1, further comprising causing a display of the first device to be used as an interface to permit a user to sign the second device into the wireless network.

6. The method of claim 1, further comprising transmitting, to the second device, user inputs received at the first device and displaying the user inputs on a display device associated with the first device.

7. The method of claim 1, further comprising transmitting, to the access point, user inputs received at the first device and causing display of the user inputs on a display device associated with the first device.

8. The method of claim 1, further comprising transmitting second information to the access point, wherein the second information indicates that the second device has been authenticated.

9. The method of claim 1, wherein the information comprises credential information for signing on to the wireless network.

10. A method, comprising:
 connecting, using credentials for a wireless network, a first device to the wireless network;
 determining a time window for the first device to send the credentials for the wireless network to a plurality of other devices;
 sending, by the first device and during the determined time window, the credentials for the wireless network to the plurality of other devices; and
 connecting at least one of the plurality of other devices to the wireless network using the credentials for the wireless network received from the first device.

11. The method of claim 10, wherein the wireless network comprises a first wireless network, the method further comprising:
 prior to connecting the first device to the first wireless network using the credentials for the first wireless network:
  connecting, via a second wireless network, the first device to a second device;
  sending, by the first device and over the second wireless network, a request to the second device for the credentials for the first wireless network; and
  receiving, by the first device and from the second device, the credentials.

12. The method of claim 11, wherein:
 the request comprises a request to authorize the first device to send the credentials for the first wireless network to the plurality of other devices; and
 the receiving the credentials from the second device comprises receiving authorization to send the credentials for the first wireless network to the plurality of other devices.

13. The method of claim 12, wherein the determining the time window comprises determining the time window after receiving authorization to send the credentials for the first wireless network to the plurality of other devices.

14. The method of claim 10, wherein the first device and the plurality of other devices form a network of wireless home security devices.

15. The method of claim 10, wherein the sending the credentials for the wireless network to the plurality of other devices during the time window is performed in response to a determination that each of the plurality of other devices is activated during the time window.

16. A method, comprising:
 sending, by a first device, during a time window, and to a second device, a request for the second device to assist the first device to connect to a wireless network that the second device is connected to, wherein the time window comprises a time window for the second device to assist other devices to connect to the wireless network; and
 receiving, during the time window, by the first device, and from the second device, information to connect the first device to the wireless network for wireless communications between the first device and the wireless network.

17. The method of claim 16, further comprising prior to the receiving, sending, by the first device and to the second device, credentials for authenticating the first device.

18. The method of claim 16, wherein the information to connect the first device to the wireless network comprises credential information for the wireless network, wherein the receiving comprises the first device receiving the credential information from the second device.

19. The method of claim 16, further comprising the first device using a display of the second device as an interface to permit a user to sign the first device into the wireless network.

20. The method of claim 16, further comprising using the information to connect the first device to the wireless network.

* * * * *

UNITED STATES PATENT AND TRADEMARK OFFICE
CERTIFICATE OF CORRECTION

PATENT NO. : 9,531,578 B2
APPLICATION NO. : 14/270452
DATED : December 27, 2016
INVENTOR(S) : Gilson et al.

It is certified that error appears in the above-identified patent and that said Letters Patent is hereby corrected as shown below:

In the Specification

Column 5, Detailed Description, Line 31:
Please delete "118"

Column 5, Detailed Description, Line 32:
Please delete "118"

Column 5, Detailed Description, Line 33:
Please delete "118"

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*